United States Patent [19]

Hopson

[11] Patent Number: 4,717,442

[45] Date of Patent: Jan. 5, 1988

[54] APPARATUS FOR REMOVING LABELS OR CARRIERS FROM CONTAINERS

[75] Inventor: Eric C. Hopson, Swindon, England

[73] Assignee: Metal Box Public Limited Company, Reading, England

[21] Appl. No.: 9,228

[22] Filed: Jan. 30, 1987

Related U.S. Application Data

[62] Division of Ser. No. 620,169, Jun. 13, 1984, Pat. No. 4,661,195.

[30] Foreign Application Priority Data

Jun. 21, 1983 [GB] United Kingdom ................ 8316823

[51] Int. Cl.[4] .............................................. B32B 31/18

[52] U.S. Cl. .................................. 156/584; 15/306 B; 134/131; 156/344

[58] Field of Search .................... 15/60, 306 B, 316 R, 15/405; 134/72, 104, 131, 151, 152, 165; 156/344, 584

[56] References Cited

U.S. PATENT DOCUMENTS

| | | | |
|---|---|---|---|
| 2,337,724 | 12/1943 | Mackie | 156/584 |
| 4,013,497 | 3/1977 | Wolk | 156/344 X |
| 4,033,804 | 7/1977 | Baldyga | 156/344 X |
| 4,457,317 | 7/1984 | Thompson et al. | 156/584 X |
| 4,599,131 | 7/1986 | Matuszak | 156/584 |

FOREIGN PATENT DOCUMENTS

| | | | |
|---|---|---|---|
| 7318938 | 6/1973 | Japan | 156/344 |

OTHER PUBLICATIONS

IBM Technical Disclosure Bulletin, vol. 16, No. 9, (Feb. 1974), p. 2892.

*Primary Examiner*—Robert A. Dawson
*Attorney, Agent, or Firm*—Diller, Ramik & Wight

[57] ABSTRACT

Apparatus for removing labels from cylindrical cans involves the use of air jets which are directed by nozzles between the label and the can. The jets have sufficient force to rupture the label. An exhaust fan draws air around the can to draw the ruptured label away from the can.

While the apparatus is best suited to remove sleeve like labels which are not adhesively secured to the can at least partial removal of labels which are adhesively secured to the can may be achieved.

15 Claims, 5 Drawing Figures

APPARATUS FOR REMOVING LABELS OR CARRIERS FROM CONTAINERS

This application is a division of application Ser. No. 620,169 filed 6/13/84, and now U.S. Pat. No. 4,661,195.

BACKGROUND OF THE INVENTION

1. Field of the Invention

This invention relates to methods and apparatus for removing labels or carriers from containers.

2. Description of the prior art

In our copending U.K. patent application No. 8121726 (published U.S. Pat. No. 2,101,530) there is described a process for decorating metal containers. The process involves applying a label bearing printed matter of sublimable dyestuff to a container, with the printed matter being in intimate contact with the outer surface of the container. The label is held on the container by means of a water soluble adhesive. The adhesive must also be of the variety through which the dyestuff can migrate.

The container bearing the label is then heated to cause the dyestuff to sublime and so effect a transfer of the printed matter to the outer surface of the container. Once the transfer has been effected the label is removed by soaking in water to dissolve the adhesive and if necessary applying a frictional force to detach it from the container.

The removal of the label is effected in a washer. The container is fed through the washer by a conveyor wherein it is drenched with water from water sprays. In the washer the discharged water and stripped label are passed through filtration screens to catch the released label and the water is then pumped back (by means of a water pump) to the sprays.

The disadvantage of this arrangement is that under mass production conditions a large number of containers are fed through the washer in a relatively short time and so the washer becomes subject to label congestion consequently there is a need constantly to examine and cleanse the filtration screens and to clean and service the water pump.

SUMMARY OF THE INVENTION

Accordingly the present invention provides, in a first aspect thereof, apparatus for removing labels or carriers from containers, comprising means defining a collection chamber, conveyor means for carrying a succession of containers along a path through said chamber, nozzle means for providing a jet of fluid, said nozzle means being so positioned that when each container reaches a predetermined position within said chamber the jet of fluid is directed between the label or carrier and the container to rupture the label or carrier, and exhaust means for creating a fluid flow within the chamber to carry ruptured labels released from the containers away from said path towards an exhaust port of the chamber.

The present invention also provides, in a second aspect thereof, a method for removing labels or carriers from containers, comprising feeding the containers along a path through a stripping station, directing a fluid jet between each label or carrier and its container said fluid jet being of sufficient force to rupture the label or carrier, and creating a fluid draught to carry the stripped label or carrier away from said path.

DESCRIPTION OF THE DRAWINGS

A method according to the invention, and embodiments of apparatus for performing such method, will now be described, by way of example only, with reference to the drawings hereof in which.

DESCRIPTION OF THE PREFERRED EMBODIMENTS

The problems of label removal associated with the previously proposed embodiment are overcome by replacing the washer of our previous embodiment with an air stripper apparatus. For this to be effective the labels are preferably not adhesively secured to the containers but instead have opposite overlapping end portions adhesively secured together so that the label acts as a sleeve around a container and is held thereon by friction. In this arrangement the adhesive used need not be water soluble nor permeable to dyestuffs.

Figure 1:
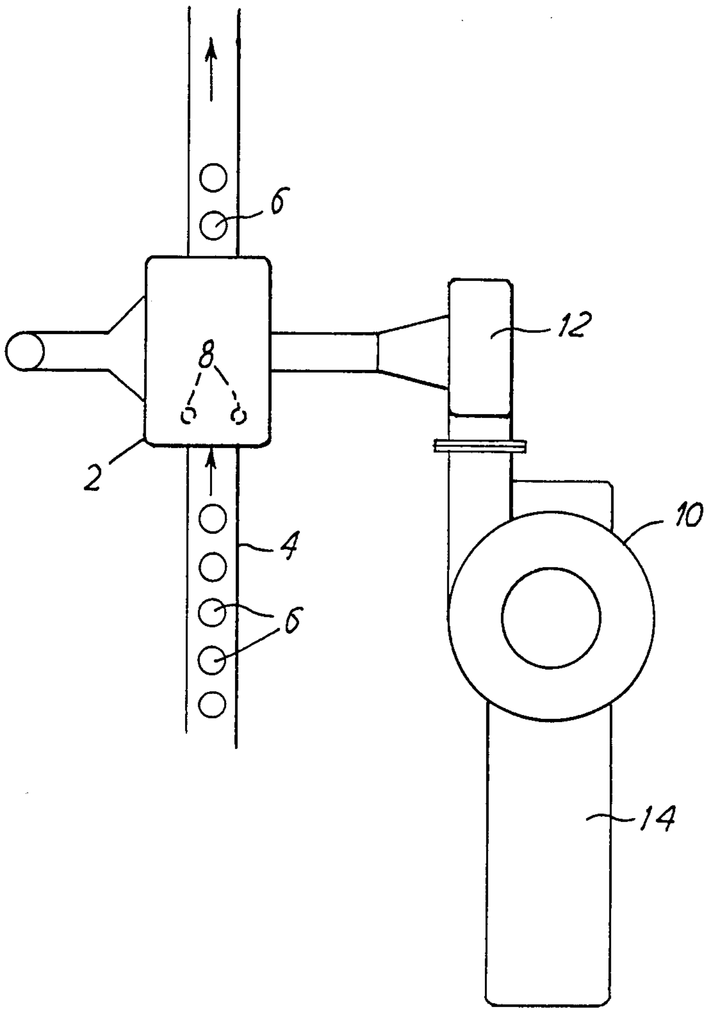
FIG. 1 is a plan view of air stripping apparatus.

The airstripping apparatus shown in FIG. 1 includes a collection box 2 defining a collection chamber through which a conveyor 4 carrying a line of cylindrical cans 6 (each with its own label sleeve) passes.

A pair of air nozzles 8 within the box are directed diametrically with respect to the cans 6 to provide balanced air jets which force air between the label sleeve and the outer surface of its corresponding can. The force of the jets is sufficient to rupture the label and so release it from its can.

An exhaust fan 12 draws the released label from the collection box and feeds it to a cyclone 10 which in turn deposits the released label into a compactor 14 where it is compacted with other labels.

Figure 2:
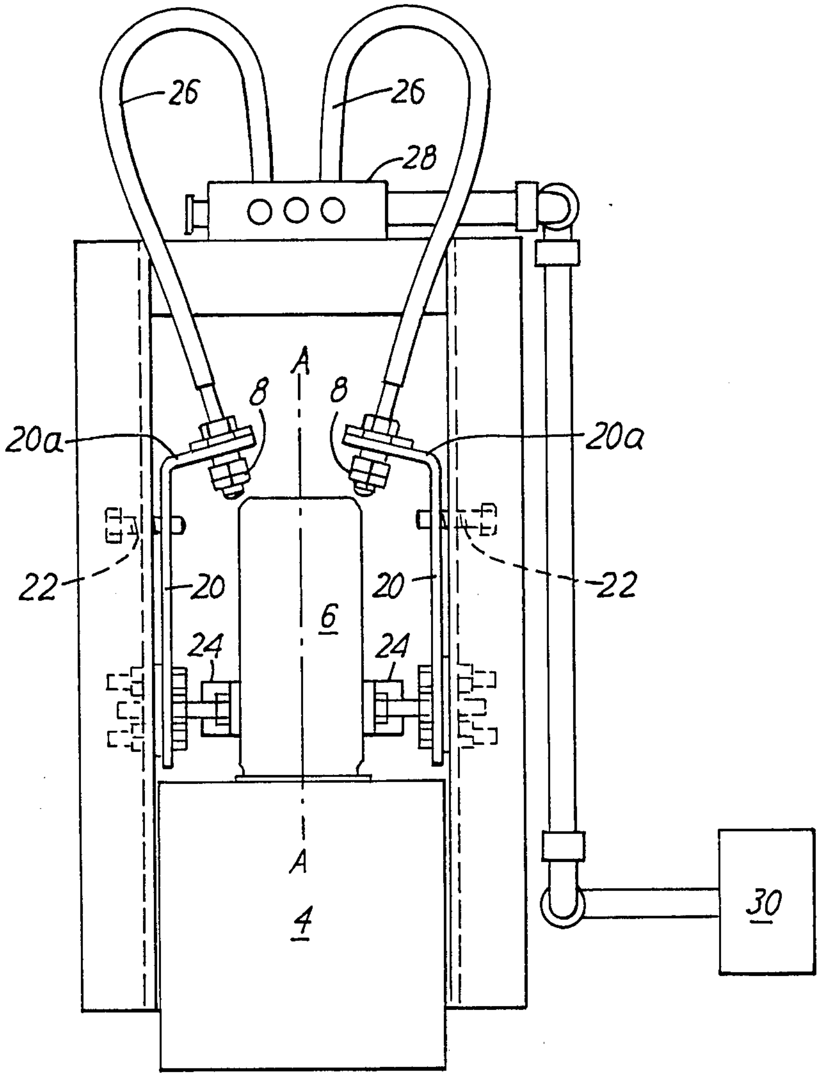
FIG. 2 is a section through the apparatus of FIG. 1.
Figure 3:
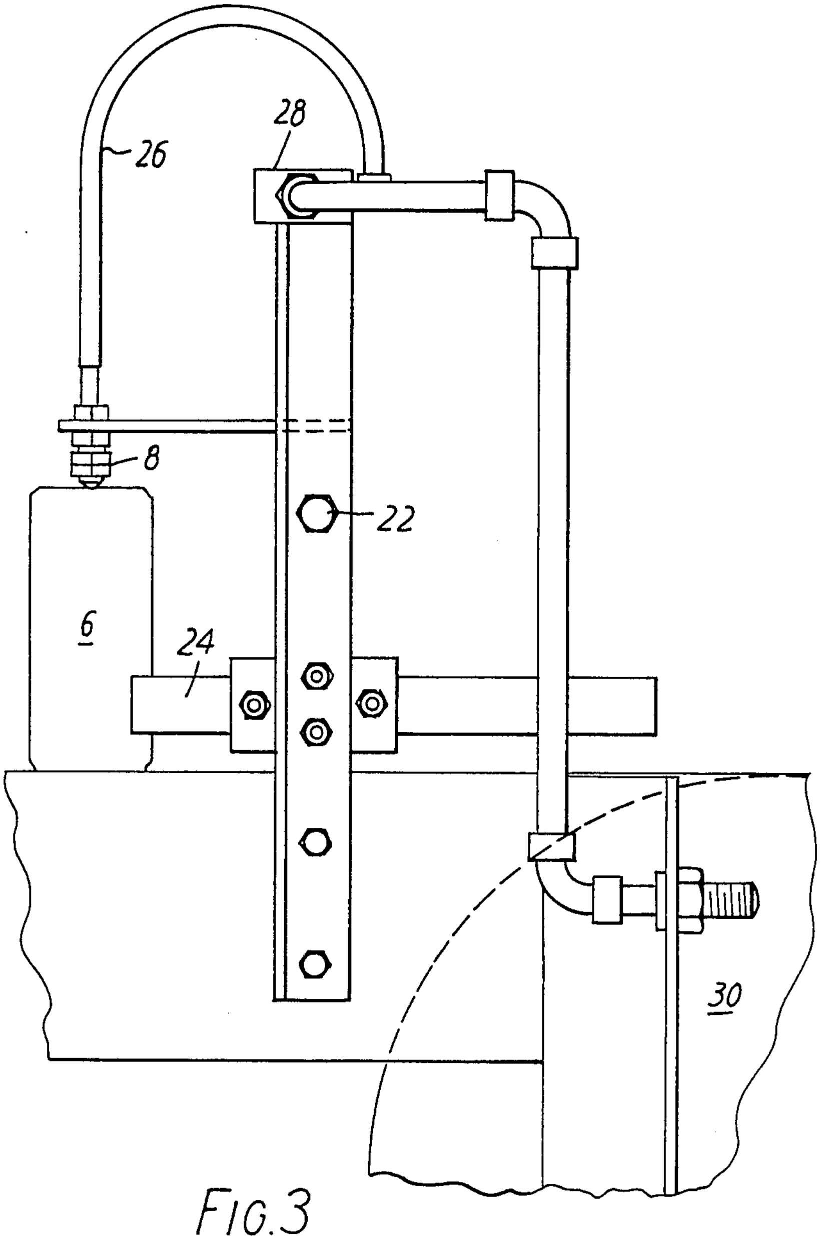
FIG. 3 is a fragmentary side elevation of the apparatus of FIG. 1.

The arrangement within the collection box 2 is shown more clearly in FIGS. 2 and 3. As shown each nozzle 8 is mountd on the bent end portion *20a* of a respective support strip 20. The opposite end portion of each support strip 20 is secured to a corresponding wall of the collection box.

An adjustment bolt 22 is screw threadedly engaged in the wall of the collection box adjacent each strip 20. The free end of each bolt 22 engages and is held captive by an intermediate portion of a respective one of the two strips 20 so that while the bolt 22 is prevented from moving longitudinally with respect to the strip 20 it has freedom to rotate. In this way by rotating the bolts 22 the angular positions of the two nozzles can be varied.

Advantageously, each nozzle is set so as to lie at an angle of about 15° with respect to the axis A—A of the can 6 and locking nuts (not shown) are used to lock the bolts in their selected positions.

A pair of guides 24 are secured to the wall of the collection box just upstream of the nozzles to direct the cans into a predetermined position below the nozzles.

The nozzles 8,8 are coupled by respective hoses 26—26 to a common coupling 28 which in turn is supplied with air under pressure from a compressor 30.

Figure 4:
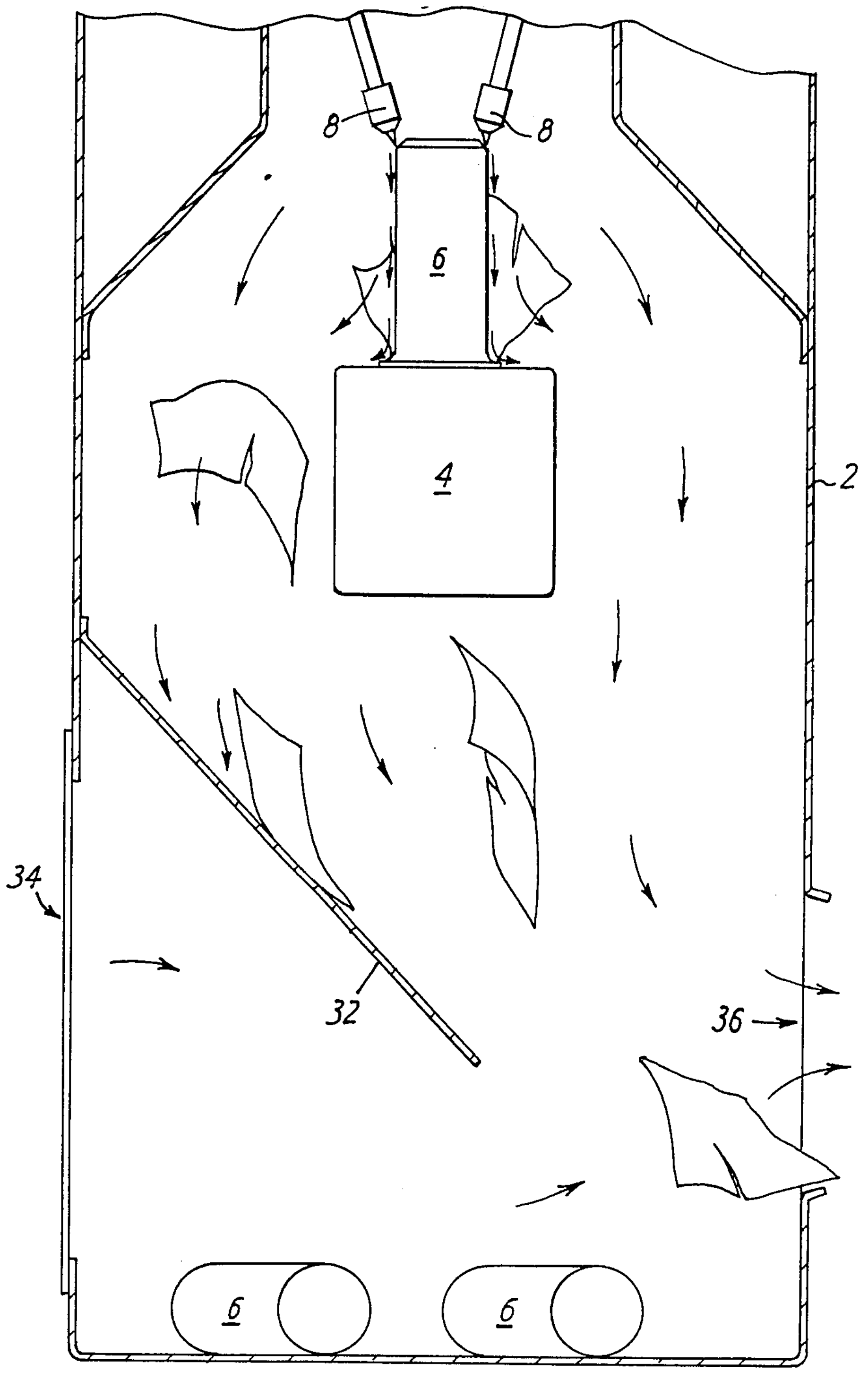
FIG. 4 is a section through the collection box of the apparatus of FIG. 1.

The configuration of the collection box is shown in more detail in FIG. 4.

The collection box has a deep well located below the conveyor 4. The well is provided to collect cans 6 which have accidentally become dislodged from the conveyor 4.

The wall on one side of the wall is provided with an air inlet grille 34, while the wall on the other side communicates with an exhaust duct 36 leading to the exhaust fan 12. A deflector plate 32 is located directly above the air inlet grille 34 to deflect falling labels toward the exhaust duct 36.

In operation the conveyor carries each can 6 in turn into the collection box to pass between the two guides 24 which act to centralise the can and stabilize it against wobble. When the can reaches the two nozzles 8—8 air is forced between the label and the can. Because of the reactive force provided by the conveyor on which the can rests the label is ruptured, one side being torn from top to bottom while the other side normally being subject only to a partial tear. While which side is fully torn is subject to the law of averages it is possible by adjusting the respective positions and/or pressures of the jets of air to predetermine the side which is fully torn. In some instances a pair of air nozzles may be mounted together, so as to direct air to one side of the can only, or alternatively, a single air nozzle may be employed.

The air drawn into the upper part of the collection box (through the conveyor inlet and outlet) by the action of the exhaust fan 12 draws the label downwardly onto the deflector plate 32 from where it is drawn into the exhaust duct 36.

Other air drawn into the collection box 2 through the air inlet grille 34 assists the passage of the torn labels into the exhaust duct 36 and so reduces their chance of falling into the bottom portion of the well which accommodates dislodged cans.

In a modification the cans are carried through the collection box by an overhead conveyor. This would enable an uninterrupted free fall for stripped labels under gravity.

Preferably, the collection box and other parts of the apparatus are earthed so as to avoid the labels clinging to these parts under the action of electrostatic forces.

The air pressure of the jets provided by the nozzles is preferably in the region of 120 pounds per square inch (844 Kg.s.m) but can be as low as 90 psi (633 Kg.s.m).

With the above apparatus typical 16 oz, drawn, wall-ironed cylindrical tin-plate cans (approximately 6" in height and 2.6" outside diameter), may be stripped of labels (221 mm×136 mm in size) at a rate in excess of 400 cans per minute. At high speeds, however, it is advantageous to provide more than just one pair of air jets to strip the labels (e.g. 3 pairs of jets operating at between 90 psi at 36 cfm and 120 psi at 55 cfm).

While the apparatus described is intended primarily for stripping labels which are not glued to the can itself, it will be appreciated that labels which are glued to the wall of the can may also be removed, if suitable adhesives and process conditions are employed. In situations where only partial label stripping occurs, the remnants of the label can be removed by other processes such as by soaking with water.

Where the material of the labels has a preferential grain direction this is desirably arranged to lie in the direction of the incipient air jets to facilitate the tearing of the labels by the jets.

The conveyor 4 is advantageously as narrow as possible to reduce the extent to which it becomes an obstruction to the falling labels. Also it is preferable that the cans are carried by the conveyor spaced at regular intervals so as to avoid irregular air flows within the collection box.

In a modification where tall cans are used the strips 20 supporting the nozzles 8,8 are mounted for vertical movement.

Figure 5:
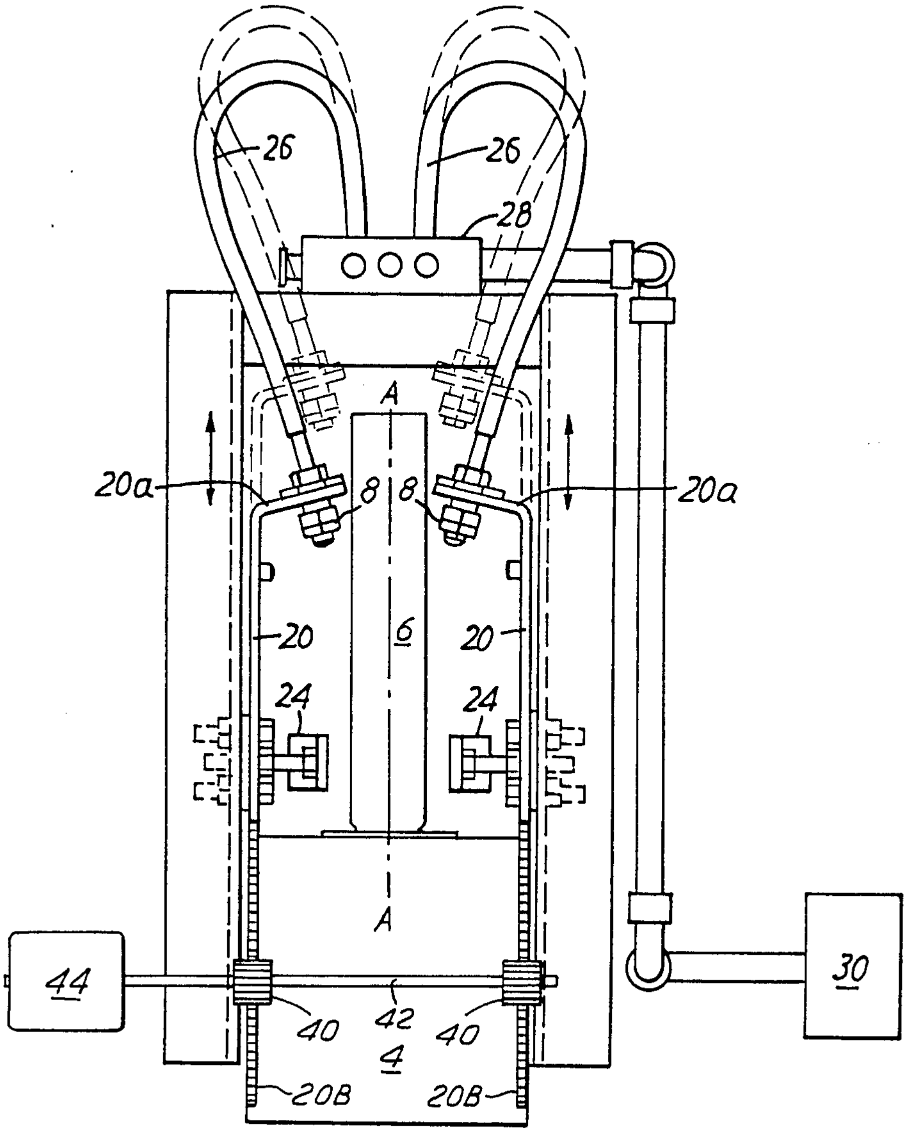
FIG. 5 is a section through a modified form of the apparatus of FIG. 1.

In the arrangement shown in FIG. 5 parts similar to those in FIG. 2 are similarly referenced. As shown the strips 20 are mounted in guides which constrain the strips 20 for vertical movement. The lower end of each strip 20 is provided with a rack 20B which is engaged by a corresponding one of two pinions 40,40 mounted on a common shaft 42. An electric motor is coupled to drive the shaft 42.

In operation with the nozzles 8', 8' in their uppermost positions (shown in broken lines) the air jets are directed between the upper edge of the label and the rim of the can 6. The motor 44 is then energised to drive the nozzles 8 in a downward direction so as to continue the rupture of the label initiated when at their uppermost positions. When the nozzles 8 have been displaced downwardly sufficiently for the label to have been ruptured from top to bottom the motor 44 is driven in reverse to return the nozzles 8 to their uppermost positions.

I claim:

1. Apparatus for removing spent wrap-around labels or carriers from containers after decoration by thermal transfer of dyes, said wrap-around labels or carriers comprising labels or carriers in which the opposing ends are brought into overlapping relationship and adhesively secured together, said apparatus comprising:
   - a conveyor to carry the containers along a path through a station;
   - means to allow access for air between said label and said container;
   - a nozzle to direct a gas or air jet between each label or carrier and its container against the reactive force of the conveyors, said gas or air jet being sufficient force to rupture the label or carrier absent melting thereof; and
   - means to create a gas or air draught to carry the label or carrier after rupture away from said path.

2. Apparatus according to claim 1 wherein the gas or air is directed at a pressure in the range of 90 psi to 120 psi.

3. Apparatus according to claim 2 wherein the gas is delivered at a rate in the range of 36 cfm to 55 cfm.

4. Apparatus according to claim 1 wherein one side guide extends along each side of the conveyor to prevent the container toppling over.

5. Apparatus for removing in a dry manner wrap-around labels or carriers from containers, said wrap-around labels or carriers comprising labels or carriers in which the opposing ends are brought into overlapping relationship and adhesively secured together but defining a gap between the label or carrier and the container to allow access to gas or air into the gap, the apparatus comprising:
   - means defining a collection chamber, having an inlet and an exhaust port;
   - means defining a path through the collection chamber;
   - conveyor means for carrying a succession of containers along said path through said chamber and defining an abutment surface below said gap;
   - nozzle means for providing a jet of compressed gas or air under predetermined pressure;

means supporting said nozzle means within said chamber so that when each container reaches a predetermined position within said chamber the jet of compressed gas or air is directed between the label or carrier and the container to react against said abutment surface and wherein said predetermined pressure is of such magnitude as to rupture the wrap-around label or carrier to permit release from the container to the chamber; and exhaust means for carrying the ruptured labels or carriers away from said container and for carrying said ruptured labels or carriers towards the exhaust port of the chamber.

6. Apparatus according to claim 5 wherein the exhaust means comprises a fan for drawing the ruptured labels or carriers from the container towards the exhaust port.

7. Apparatus according to claim 5 wherein said chamber defines a well for receiving containers dislodged from said conveyor means.

8. Apparatus according to claim 3 including deflection means located between said well and said path and spaced from the exhaust port to define a gap therebetween, the deflection means being arranged to deflect ruptured labels or carriers away from the well and towards the exhaust port.

9. Apparatus according to claim 8 wherein the said inlet is located below said deflection means to create a gas or air current flow across the gap between said deflection means and said exhaust port.

10. Apparatus according to claim 5 wherein the said path extends through an upper portion of the chamber and the said port is in a lower portion thereof.

11. Apparatus according to claim 5 wherein said exhaust means includes a cyclone and exhaust fan for directing gas or air flow from said chamber to said cyclone.

12. Apparatus according to claim 11 including a compactor for receiving ruptured labels or carriers from said cyclone.

13. Apparatus according to claim 5 including adjustment means for adjusting the nozzle means to alter the direction of said jet of gas or air.

14. Apparatus according to claim 1 including guide means for guiding said containers into said predetermined position and adjustment means for adjusting the nozzle to direct the air or gas between the label and the container surface.

15. Apparatus according to claim 5, including means for constraining the nozzle means for displacement in a direction at right angles to the path whereby to effect displacement of the jets progressively along each said container to ensure the complete rupture of the label thereon.

* * * * *